(12) United States Patent
Saito et al.

(10) Patent No.: US 7,476,445 B2
(45) Date of Patent: *Jan. 13, 2009

(54) SURFACE-TREATED METAL SHEET

(75) Inventors: Koichi Saito, Shinagawa-ku (JP);
Motohiro Sasaki, Shinagawa-ku (JP);
Atsushi Morishita, Kimitsu (JP); Akira Takahashi, Kimitsu (JP); Hiroshi Kanai, Kimitsu (JP); Masahiro Fuda, Futtu (JP)

(73) Assignees: Nippon Steel Corporation, Tokyo (JP);
Nippon Paint Co., Ltd., Kita-ku, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/540,507

(22) Filed: Oct. 2, 2006

(65) Prior Publication Data

US 2008/0081196 A1  Apr. 3, 2008

(51) Int. Cl.
*B32B 15/082* (2006.01)
*B32B 15/085* (2006.01)
*B32B 15/092* (2006.01)
*B32B 15/095* (2006.01)
*B32B 27/18* (2006.01)

(52) U.S. Cl. .................. 428/425.8; 428/413; 428/418; 428/423.1; 428/457; 428/461; 106/14.05; 106/14.11; 106/14.13; 106/14.14; 106/14.15; 106/14.16; 106/14.17; 106/14.21

(58) Field of Classification Search .................. None
See application file for complete search history.

(56) References Cited

U.S. PATENT DOCUMENTS

| 4,042,539 | A | * | 8/1977 | Fanning ........................ 524/40 |
| 4,436,849 | A | * | 3/1984 | Aihara et al. ................. 523/501 |
| 4,478,994 | A | * | 10/1984 | Doerffel et al. .............. 528/304 |
| 4,730,016 | A | * | 3/1988 | Fujii et al. ..................... 524/96 |
| 5,001,173 | A | * | 3/1991 | Anderson et al. ............ 523/406 |
| 5,082,698 | A | * | 1/1992 | Anderson et al. ............ 427/386 |
| 5,168,105 | A | * | 12/1992 | Anderson et al. ............ 524/441 |
| 5,202,364 | A | * | 4/1993 | Taniguchi et al. ............ 523/403 |
| 5,409,970 | A | * | 4/1995 | Mosser et al. ................ 523/223 |
| 5,578,669 | A | * | 11/1996 | Odawa et al. ................ 524/414 |
| 5,589,535 | A | * | 12/1996 | Schwab et al. ............... 524/591 |
| 6,458,897 | B1 | * | 10/2002 | Tokita et al. ................. 525/438 |
| 6,562,474 | B1 | * | 5/2003 | Yoshimi et al. ............ 428/472.3 |
| 7,029,762 | B2 | * | 4/2006 | Ishizuka et al. .............. 428/659 |
| 2004/0076833 | A1 | * | 4/2004 | Sanduja et al. ............ 428/422.8 |
| 2005/0025991 | A1 | * | 2/2005 | Ishizuka et al. .............. 428/626 |
| 2005/0175798 | A1 | * | 8/2005 | Kurokawa et al. .......... 428/34.1 |

FOREIGN PATENT DOCUMENTS

| EP | 0 081 040 | * | 6/1983 |
| JP | 55-054364 | * | 4/1980 |
| JP | 02-003462 | * | 1/1990 |
| JP | 06-246229 | * | 9/1994 |
| JP | 10-176119 | * | 6/1998 |
| JP | 11-268178 A | | 10/1999 |
| JP | 2001-164182 A | | 6/2001 |
| JP | 2001-199003 A | | 7/2001 |
| JP | 2001-214283 A | | 8/2001 |
| JP | 2001-288582 A | | 10/2001 |
| JP | 2003-49281 A | | 2/2003 |
| JP | 2003-105555 A | | 4/2003 |
| JP | 2005-48199 A | | 2/2005 |
| JP | 2005-199673 A | | 7/2005 |
| JP | 2005-281863 A | | 10/2005 |
| JP | 2005-281863 A | | 10/2005 |

* cited by examiner

*Primary Examiner*—Vivian Chen
(74) *Attorney, Agent, or Firm*—Connolly Bove Lodge & Hutz LLP

(57) ABSTRACT

It is an object of the present invention to provide an organic coating-treated metal sheet, having a coat capable of satisfying all the corrosion resistance, alkali resistance, solvent resistance, anti-scratch property and adhesion requirements which the conventional nonchromate type coating technologies have been difficult to meet. A surface-treated metal sheet with a coat comprising 50; to 90% by weight of a crosslinked resin matrix (A) and 10 to 50% by weight of an inorganic rust preventive (B) as formed on the metal sheet surface, wherein the crosslinked resin matrix (A) is formed by the reaction between a water-borne resin and a crosslinking agent and has an acid value of 0 to 30 due to carboxylic acid groups not neutralized by an alkali metal and a hydroxyl value of 5 to 50.

20 Claims, No Drawings

SURFACE-TREATED METAL SHEET

TECHNICAL FIELD

This invention relates to a surface-treated metal sheet.

BACKGROUND ART

Metal sheets made of iron, an iron-based alloy, aluminum, an aluminum-based alloy, copper or a copper-based alloy, for instance, have so far been widely subjected to chromate treatment for rust prevention using chromates containing hexavalent chromium, among others, and, if necessary, further to coating with an organic resin for providing them with high-level corrosion resistance, fingerprint resistance, anti-scratch property, lubricity and so forth, followed by overcoating with any of various coating compositions according to need.

In view of the increasing interest in environmental problems in recent years, there is a trend toward omission of the chromate treatment so far given to metal sheets. Since the chromate-treated metal sheet has high-level corrosion resistance and coating receptivity, it is anticipated that the omission of chromate treatment will cause marked reductions in such performance characteristics. Thus, it has come to be demanded that a rust preventive layer having good corrosion resistance and coating receptivity be formed by only one-step treatment with an organic resin without carrying out chromate surface treatment.

Japanese Kokai Publication 2001-164182 discloses a rust preventive coating agent comprising a water-borne resin composition obtained by reacting a water-borne polyurethane resin, a water-borne polyolefin resin, water-dispersed silica and a composition comprising a silane coupling agent and/or a hydrolyzate condensate derived therefrom together, a thiocarbonyl group-containing compound and the phosphate ion, a method for rust preventive treatment which comprises applying the coating agent, and a metal material treated for rust prevention by coating with the coating agent. However, the use of such a rust preventive coating agent having a relatively high acid value has a problem in that the coats to be obtained are poor in alkali resistance.

Japanese Kokai Publication 2001-199003 discloses an organic composite-coated steel sheet having an organic composite coat comprising a composite resin derived from specific organic resins on the surface of a zinc-coated steel sheet or aluminum-coated steel sheet. However, the formed coat is insufficient in the degree of crosslinking and, for example, it is a problem that the coat is greatly damaged in the solvent rubbing test.

Japanese Kokai Publication 2001-214283 discloses a surface-treated zinc-coated steel sheet having a coat layer formed by applying an aqueous composition comprising a metal compound, a water-soluble organic resin and an acid to the surface of the zinc-coated steel sheet. However, the water-soluble resin has a relatively high carboxyl group content and therefore the sheet is poor in alkali resistance; this is a problem.

Japanese Kokai Publication 2003-49281 discloses a surface-treated metal sheet having an organic coat formed, on at least one side of the metal sheet, from an epoxy resin and a glycoluril resin. However, the organic coat comprises no rust preventive agent and, therefore, it has a problem that the corrosion resistance is insufficient.

Japanese Kokai Publication 2003-105555 discloses a surface-treated steel sheet having a surface treatment coat formed on the surface of a zinc-coated steel sheet or aluminum-coated steel sheet, from a surface treating composition comprising (a) a water-dispersible resin and/or water-soluble resin, (b) a silane coupling agent and (c) phosphoric acid and/or a hexafluorometallic acid. However, the coat comprises a large amount of an acidic component such as phosphoric acid and, therefore, has a problem in that the alkali resistance is insufficient.

SUMMARY OF THE INVENTION

In view of the above-discussed state of the art, it is an object of the present invention to provide an organic coating-treated metal sheet, having a coat capable of satisfying all the corrosion resistance, alkali resistance, solvent resistance, anti-scratch property and adhesion requirements which the conventional nonchromate type coating technologies have been difficult to meet.

The present invention provide a surface-treated metal sheet with a coat comprising 50 to 90% by weight of a crosslinked resin matrix (A) and 10 to 50% by weight of an inorganic rust preventive (B) as formed on the metal sheet surface, wherein the crosslinked resin matrix (A) is formed by the reaction between a water-borne resin and a crosslinking agent and has an acid value of 0 to 30 due to carboxylic acid groups not neutralized by an alkali metal and a hydroxyl value of 5 to 50.

Preferably, the coat formed on the metal sheet surface further comprises 0.1 to 10% by weight of an organic rust preventive (C).

Preferably, the coat formed on the metal sheet surface further comprises 0.1 to 20% by weight of a lubricant (D).

Preferably, the water-borne resin is at least one species selected from the group consisting of water-borne polyester resins, water-borne polyurethane resins, water-borne epoxy resins, water-borne acrylic resins and water-borne polyolefin resins, and the crosslinking agent is at least one species selected from the group consisting of amino resins, polyisocyanate compounds, blocked polyisocyanate compounds, epoxy compounds, carbodiimide compounds, silane compounds, crosslinking zirconium compounds and titanium compounds.

Preferably, the water-borne resin is an alkali metal-neutralized ethylene-unsaturated carboxylic acid copolymer with a neutralization degree of 30 to 90%.

Preferably, the inorganic rust preventive (B) comprises silica particles and at least one species selected from the group consisting of phosphoric acid compounds, niobium compounds and zirconium compounds.

Preferably, the content of silica particles in the coat is 9.95 to 49.95% by weight and the content of the phosphoric acid compound in the coat is 0.05 to 2.5% by weight.

Preferably, the content of silica particles in the coat is 9 to 49% by weight and the total content of the niobium compound and zirconium compound in the coat is 1 to 15% by weight.

Preferably, the inorganic rust preventive (B) comprises silica particles, a phosphoric acid compound, and at least one species selected from the group consisting of niobium compounds and zirconium compounds.

Preferably, in the coat, the content of silica particles is 8.95 to 48.95% by weight, the content of the phosphoric acid compound is 0.05 to 2.5% by weight, and the total content of the niobium compound and zirconium compound is 1 to 15% by weight.

Preferably, the inorganic rust preventive (B) comprises niobium oxide and/or zirconium oxide.

Preferably, the organic rust preventive (C) comprises at least one species selected from the group consisting of guanidino group-containing compounds, biguanidino group-containing compounds and thiocarbonyl group-containing compounds.

Preferably, the lubricant (D) comprises at least one species selected from the group consisting of polyolefin waxes, derivatives of the wax, silicones and derivatives of the silicone.

DETAILED DESCRIPTION OF THE INVENTION

Hereinafter, the present invention is described in detail.

The surface-treated metal sheet of the present invention is excellent in corrosion resistance, adhesion to a coat, adhesion to a top-coating film, chemical resistance, anti-scratch property and so forth, and can be suitably used in such applications as household electric appliances, business machines, building materials and automobiles.

The surface-treated metal sheet mentioned above has a coat comprising a crosslinked resin matrix (A) being formed by the reaction between a water-borne resin and a crosslinking agent and having an acid value and a hydroxyl value falling within respective specific ranges; and an inorganic rust preventive (B) Thus, the metal sheet of the invention has a coat comprising the specific crosslinked resin matrix (A) and the inorganic rust preventive (B) and, therefore, is excellent in corrosion resistance, adhesion to a coat, adhesion to a top-coating film and chemical resistance.

In the case of water-borne resin-based coating agents, the carboxyl group is particularly suitable as the hydrophilic functional group in the resin, which is neutralized by an alkaline component and becomes hydrophilic after coat formation. On the other hand, when the resin has no other hydrophilic groups than the carboxyl group and the carboxyl group content is reduced to an extremely low level, the dissolution in an alkaline milieu can be prevented but the adhesion to the substrate and to a top-coating film may become inferior because of almost no occurrence of polar functional groups. The present invention is based on the finding that, for obtaining a coat having the good adhesion to the substrate and to a top-coating film and being excellent in alkali resistance, it is effective to introduce an appropriate amount of the hydroxyl group into the resin in addition to the minimum necessary amount of the carboxyl group. The reason why the dissolution in an alkaline milieu can be inhibited by the hydroxyl group introduction while keeping the good adhesion is presumably that the hydroxyl group is capable of hydrogen bonding or reacting with another functional group but has no solubility in alkaline components unlike the carboxyl group.

For giving the solvent resistance, it is a general practice to select a resin showing a great difference in solubility parameter (SP) from the solvent to be used. To deal with a wide range of solvents, from kerosene low in SP to ethanol high in SP, however, it is more effective to render the resin insoluble rather by crosslinking than the SP-based selection. Although a higher degree of crosslinking of the resin is more effective in reducing the solubility of the resin coat by itself in solvents, the adhesion to the substrate and to a top-coating film tends to decrease as the degree of crosslinking increases. The one of the reasons why the adhesion decreases with the increase in degree of crosslinking is presumably that strains are caused by the crosslinking reaction or polar functional groups are consumed in the crosslinking reaction, hence disappear.

Therefore, in accordance with the present invention, a coat comprising a crosslinked resin matrix (A) having the carboxyl group and hydroxyl group in amounts within respective appropriate ranges and an inorganic rust preventive (B) is formed on the metal sheet surface, whereby excellent adhesion to substrate and top-coating film, alkali resistance and solvent resistance can be given to the surface and, at the same time, excellent corrosion resistance can also be obtained.

The crosslinked resin matrix (A) is formed by the reaction between a water-borne resin and a crosslinking agent. The reaction (crosslinking reaction between water-borne resin and crosslinking agent) may be carried out on the occasion of coat formation on the metal sheet surface, or the reaction may be carried out in part prior to coat formation and then completed on the occasion of coat formation.

The water-borne resin is not particularly restricted but preferably is at least one species selected from the group consisting of water-borne polyester resins, water-borne polyurethane resins, water-borne epoxy resins, water-borne acrylic resins and water-borne polyolefin resins.

The water-borne polyester resins can be obtained, for example, by subjecting to dehydration condensation a polyhydric alcohol such as ethylene glycol, propylene glycol, diethylene glycol, 1,6-hexanediol, neopentyl glycol, triethylene glycol, bisphenol hydroxypropyl ether, glycerol, trimethylolethane or trimethylolpropane, and a polybasic acid such as phthalic anhydride, isophthalic acid, terephthalic acid, succinic anhydride, adipic acid, sebacic acid, maleic anhydride, itaconic acid, furmaric acid or Hymic anhydride, followed by neutralizing with ammonia or an organic amine and dispersing in water.

The water-borne polyurethane resins can be obtained, for example, by reacting a polyhydric alcohol such as ethylene glycol, propylene glycol, diethylene glycol, 1,6-hexanediol, neopentyl glycol, triethylene glycol, bisphenol hydroxypropyl ether, glycerol, trimethylolethane or trimethylolpropane with a diisocyanate compound such as hexamethylene diisocyanate, isophoronediisocyanate, xylylene diisocyanate, tolylene diisocyanate or diphenylmethanediisocyanate, followed by further chain extension using a diamine, for instance, and dispersing in water.

The water-borne epoxy resins can be obtained, for example, by forcedly emulsifying an epoxy resin such as a bisphenol A-based epoxy resin, bisphenol F-based epoxy resin, resorcinol-based epoxy resin or phenol novolak-based epoxy resin, using a surfactant, for dispersing in water, or by reacting such an epoxy resin with an acrylic resin having a high acid value, followed by neutralizing with ammonia or organic amine, for instance, and dispersion in water.

The water-borne acrylic resins can be obtained, for example, by radical polymerization of one or more unsaturated monomers selected from among acrylic acid and methacrylic acid, alkyl esters, hydroxyalkyl esters and amides thereof, and styrene in water in the presence of a surfactant.

The water-borne polyolefin resins can be obtained, for example, by radical polymerization of ethylene with an unsaturated carboxylic acid such as methacrylic acid, acrylic acid, maleic acid, fumaric acid, itaconic acid or crotonic acid under high pressure conditions, followed by neutralizing with an alkali metal hydroxide (e.g. metal compound such as KOH, NaOH, LiOH, etc.), ammonia or an amine, for instance, and dispersing in water.

The water-borne resins mentioned above may be used singly or in the form of a combination of two or more. Use may also be made of one or more of water-borne composite resins obtained by modification, in the presence of at least one species among the water-borne resins mentioned above, with at least one other species selected from the group consisting of water-borne polyester resins, water-borne polyurethane resins, water-borne epoxy resins, water-borne acrylic resins and water-borne polyolefin resins.

The water-borne resin mentioned above is preferably an alkali metal-neutralized ethylene-unsaturated carboxylic acid copolymer mentioned above. By saying herein that the water-borne resin is the alkali metal-neutralized ethylene-unsaturated carboxylic acid copolymer, it is meant that the carboxyl groups contained in the ethylene-unsaturated carboxylic acid copolymer are in a condition partly neutralized by the alkali metal provided by such a metal compound as KOH, NaOH or LiOH.

For the alkali metal-neutralized ethylene-unsaturated carboxylic acid copolymer mentioned above, a lower limit to the degree of neutralization is preferably 30% and an upper limit thereto is preferably 90%. By saying that the lower limit of 30% and the upper limit of 90% to the degree of neutralization, it is meant that 30 to 90% of the carboxyl groups contained in the ethylene-unsaturated carboxylic acid copolymer are in a neutralized state. When that degree is lower than 30%, the obtained coat will be insufficient in adhesion to the substrate and, when it is higher than 90%, the adhesion between the coat and a top-coating film may be deteriorated. The lower limit is more preferably 40%, and the upper limit is more preferably 80%.

The ethylene-unsaturated carboxylic acid copolymer is a copolymer obtained by radical polymerization, under pressurization, of ethylene with an unsaturated carboxylic acid such as methacrylic acid, acrylic acid, maleic acid, fumaric acid, itaconic acid or crotonic acid.

The water-borne resin mentioned above may be the product of neutralization of the above-mentioned ethylene-unsaturated carboxylic acid copolymer with an amine (e.g. water-soluble amine such as triethylamine or ethanolamine), or ammonia, for instance. The amine may be used singly or in the form of a combination of two or more.

In preparing the water-borne resin mentioned above, the ethylene-unsaturated carboxylic acid copolymer may be neutralized with an alkali metal together with ammonia or an amine.

The crosslinking agent mentioned above is not particularly restricted but may be any of those having a plurality of reactive functional groups. Preferably, it includes at least one species selected from the group consisting of amino resins, polyisocyanate compounds, blocked polyisocyanate compounds (products of blocking of the polyisocyanate compounds), epoxy compounds, carbodiimide compounds, silane compounds, crosslinking zirconium compounds and titanium compounds. By obtaining the crosslinked resin matrix (A) using these, it becomes possible to secure the solvent resistance.

The amino resins are not particularly restricted but include, among others, melamine resins, benzoguanamine resins, urea resins and glycoluril resins. The polyisocyanate compounds are not particularly restricted but include, among others, hexamethylene diisocyanate, isophorone diisocyanate, xylylene diisocyanate and tolylene diisocyanate. The blocked polyisocyanate compounds are products derived from the polyisocyanate compounds by blocking.

The epoxy compounds are not particularly restricted but include compounds having a plurality of oxirane rings, for example diglycidyl adipate, diglycidyl phthalate, diglycidyl terephthalate, sorbitan polyglycidyl ether, pentaerythritol polyglycidyl ether, glycerol polyglycidyl ether, trimethylpropane polyglycidyl ether, neopentyl glycol polyglycidyl ether, ethylene glycol diglycidyl ether, polyethylene glycol diglycidyl ether, propylene glycol diglycidyl ether, polypropylene glycol diglycidyl ether, 2,2-bis(4'-glycidyloxyphenyl)propane, tris(2,3-epoxypropyl)isocyanurate, bisphenol A diglycidyl ether and hydrogenated bisphenol A diglycidyl ether.

As the carbodiimide compounds, there may be mentioned, for example, compounds prepared by synthesizing isocyanate-terminated polycarbodiimides from a diisocyanate compound such as an aromatic diisocyanate, aliphatic diisocyanate or alicyclic diisocyanate by subjecting the same to condensation reaction under removal of carbon dioxide, followed by further addition of a hydrophilic segment having a functional group reactive with the isocyanate group.

The silane compounds are not particularly restricted but include silane compounds having a plurality of reactive functional groups, for example vinyltrimethoxysilane, γ-aminopropyltrimethoxysilane, γ-aminopropyltriethoxysilane, γ-glycidoxypropyltrimethoxysilane, γ-methacryloxypropyltriethoxysilane, γ-isocyanatopropyltriethoxysilane and γ-ureidopropyltriethoxysilane.

The crosslinking zirconium compounds are not particularly restricted but include zirconium-containing compounds having a plurality of functional groups capable of reacting with the carboxyl or hydroxyl group, preferably such compounds soluble in water or an organic solvent, more preferably water-soluble zirconium compounds. Ammonium zirconium carbonate may be mentioned as such a compound.

The titanium compounds are not particularly restricted but include titanium compounds having a plurality of functional groups capable of reacting with the carboxyl or hydroxyl group, for example dipropoxybis(triethanolaminato)titanium, dipropoxybis(diethanolaminato)titanium, propoxytris(diethanolaminato)titanium, dibutoxybis(triethanolaminato)titanium, dibutoxybis(diethanolaminato)titanium, dipropoxybis(acetylacetonato)titanium, dibutoxybis(acetylacetonato)titanium, dihydroxybis(lactato)titanium monoammonium salt, dihydroxybis(lactato)titanium diammonium salt, propanedioxytitanium bis(ethyl acetoacetate), oxotitanium bis(monoammonium oxalate) and isopropyl tri (N-amidoethylaminoethyl)titanate. The above-mentioned crosslinking agents may be used singly or in the form of a combination of two or more.

More preferred as the crosslinked resin matrix (A) from the viewpoint of improved adhesion to the substrate and to a top-coating film and improved corrosion resistance are (1) those comprising the above-mentioned water-borne polyolefin resin, and an epoxy compound, silane compound and titanium compound as the crosslinking agent; and (2) those comprising the above-mentioned water-borne polyurethane resin, and a silane compound and amino resin as the crosslinking agent.

The crosslinked resin matrix (A) has an acid value due to the carboxylic acid groups not neutralized by an alkali metal within a range from a lower limit of 0 to an upper limit of 30, and a hydroxyl value within a range from a lower limit of 5 to the upper limit of 50. When the matrix (A) has such an acid value and such a hydroxyl value, a coat excellent in adhesion to the substrate and to a top-coating film and in alkali resistance can be formed, and the coat is also excellent in solvent resistance. When the acid value is above 30, the alkali resistance may possibly decrease. The lower limit of the acid value is more preferably 5. When, on the other hand, the hydroxyl value is lower than 5, the adhesion to the substrate and to a top-coating film may possibly lower and, when the hydroxyl value is higher than 50, the water resistance or the resistance to high-SP solvents may possibly decrease.

The content of the crosslinked resin matrix (A) in the coat on the surface-treated metal sheet is within the range from a lower limit of 50% by weight to an upper limit of 90% by weight, relative to 100% by weight of the coat. When the content is lower than 50% by weight, the adhesion to the substrate and to a top-coating film and the alkali resistance decrease. When it is above 90% by weight, the corrosion resistance becomes low. The lower limit is more preferably 65% by weight, and the upper limit is more preferably 85% by weight.

The surface-treated metal sheet mentioned above has a coat comprising the inorganic rust preventive (B) as formed thereon. By this, good corrosion resistance can be obtained. The inorganic rust preventive is not particularly restricted but any of those inorganic rust preventives known in the art can be used. Preferably, it comprises at least one species selected from the group consisting of silica particles, phosphoric acid compounds, niobium compounds and zirconium compounds.

When the silica particles mentioned above are contained in the coat, the corrosion resistance can be more improved. The silica particles are not particularly restricted but, in view of the fact that the coat is thin, fine silica particles such as colloidal silica or fumed silica with a primary particle diameter of 5 to 50 nm are preferred. As commercially available products, there may be mentioned, for example, Snowtex O, Snowtex N, Snowtex C, Snowtex IPA-ST (Nissan Chemical), Adelite AT-20N, AT-20A (Asahi Denka Kogyo) and Aerosil 200 (Nippon Aerosil).

When the phosphoric acid compounds are contained in a coat, a phosphate layer is formed on the base metal surface to cause passivation and thus lead to improved rust prevention. As the phosphoric acid compounds, there may be mentioned, for example, orthophosphoric acid, metaphosphoric acid, pyrophosphoric acid, triphosphoric acid, tetraphosphoric acid and other phosphoric acids, and salts thereof; aminotri (methylenephosphonic acid), 1-hydroxyethylidene-1,1-diphosphonic acid, ethylenediaminetetra(methylenephosphonic acid), diethylenetriaminepenta (methylenephosphonic acid) and like phosphonic acids, and salts thereof; phytic acid and like organophosphoric acids, and salts thereof.

The niobium compounds mentioned above are not particularly restricted but those niobium-containing compounds known in the art can be used. For example, there may be mentioned niobium oxide, niobic acid and salts thereof, fluoroniobic acid and fluorooxoniobic acid salts. Among them, niobium oxide is preferred from the improved corrosion resistance viewpoint.

Among the niobium compounds, niobium oxide colloidal particles are more preferred. The use thereof can result in more improved corrosion resistance. A coat can be formed by applying an aqueous coating agent containing niobium oxide colloidal particles in an aqueous medium to a metal sheet. The above-mentioned niobium oxide colloidal particles are more preferably smaller in average particle diameter since such particles can stably form a niobium-containing compact coat film and can thus stably provide the treatment target article with rust resistance.

The niobium oxide colloidal particles in the aqueous coating agent are fine particles of niobium oxide as dispersed in water and may be in an amorphous condition in a state intermediate between niobium hydroxide and niobium oxide without the formation of niobium oxide in the strict sense of the term.

As the niobium oxide particles to be added to the aqueous coating agent, use can be made of niobium oxide sols produced by the methods known in the art. The niobium oxide sols are not particularly restricted but include those produced by the known methods described in Japanese Kokai Publication H06-321543, Japanese Kokai Publication H08-143314 and Japanese Kokai Publication H08-325018, among others. The niobium oxide sols commercially available from Taki Chemical Co., Ltd. can also be used.

For example, one of the known methods of producing niobium oxide sols comprises dissolving niobium oxide in hydrofluoric acid, adding aqueous ammonia, obtaining a niobium oxide slurry by filtration and washing, adding oxalic acid dihydrate, then adding water, and allowing the reaction to proceed with stirring under refluxing conditions to thereby obtain a uniform liquid containing niobium oxide colloidal particles. The completion of the reaction, namely whether a uniform liquid containing niobium oxide colloidal particles is obtained or not, can be judged by the color of the slurry. When the liquid assumes a blue color, the liquid can be judged to be in a uniform condition.

Preferred as the niobium oxide colloidal particles are those derived from a niobium oxide sol stabilized with citric acid or a salt thereof since these can especially improve the corrosion resistance. In this case, use can be made of a niobium oxide sol resulting from dispersion, in an aqueous medium, of niobium oxide colloidal particles stabilized with citric acid or a salt thereof. Such a niobium oxide sol is an oxalic acid-stabilized niobium oxide sol highly stabilized by further causing citric acid to be contained therein. Such a niobium oxide sol is stable for a long period of time, without causing increases in viscosity, gelation or precipitation. The niobium oxide sol is in a condition highly stabilized with citric acid or a salt thereof. The level of addition of oxalic acid or a salt thereof to be added on the occasion of producing the niobium oxide sol mentioned above is not particularly restricted. Favorably, owing to this, the stability of niobium oxide colloidal particles will not decrease even on the occasion of blending with other components contained in the aqueous coating agent.

Here, an amount of citric acid or a salt thereof to be added is preferably within the range from a lower limit of 0.02 to an upper limit of 1.0 as expressed in terms of mole ratio to Nb in the aqueous coating agent. When the amount of citric acid or a salt thereof to be added is lower than 0.02 in terms of mole ratio, the stability becomes insufficient upon addition of other components, while it exceeds 1.0, any further stabilizing effect proportional to the addition level will not be given, hence are uneconomical.

The niobium oxide colloidal particles mentioned above preferably have an average particle diameter of not greater than 1000 nm. The average particle diameter is more preferably 2 to 600 nm, still more preferably 2 to 100 nm. When the average particle diameter is relatively smaller, coats comprising more stable niobium oxide in a more compact condition can be obtained and thus can favorably provide treatment target articles with stable rust resistance. The average particle diameter of niobium oxide colloidal particles can be measured using a dynamic light scattering particle size analyzer, for example NICOMP Model 370 (produced by Pacific Scientific).

When the coat on the surface-treated metal sheet comprises niobium oxide, the niobium oxide content is preferably within the range from a lower limit of 1% by weight to an upper limit of 15% by weight as expressed on the $Nb_2O_5$ basis relative to 100% by weight of the coat. When that content is lower than 1% by weight, no sufficient rust prevention will unfavorably be attained. When it exceeds 15% by weight, no further improvements in the intended effect will be given, hence may be uneconomical.

The zirconium compounds mentioned above are not particularly restricted but use can be made of those so-far known zirconium-containing compounds other than the crosslinking zirconium compounds [zirconium-containing compounds having a plurality of functional groups capable of reacting with the carboxyl group or hydroxyl group], for example zirconium oxide, hexafluorozirconic acid and salts thereof.

In the coat on the surface-treated metal sheet, a content of the inorganic rust preventive (B) is within the range from a lower limit of 10% by weight to an upper limit of 50% by weight, relative to 100% by weight of the coat. When the content is lower than 10%, the corrosion resistance may become low. When it exceeds 50% by weight, the adhesion to the substrate and to a top-coating film and the alkali resistance may possibly become lower. The lower limit is more preferably set at 15% by weight, and the upper limit is more preferably set at 40% by weight.

In the surface-treated metal sheet mentioned above, the inorganic rust preventive (B) preferably comprises silica particles and at least one species selected from the group consisting of phosphoric acid compounds, niobium compounds and zirconium compounds. By this, still better corrosion resistance can be attained.

When the inorganic rust preventive (B) comprises silica particles and at least one species selected from the group consisting of phosphoric acid compounds, niobium compounds and zirconium compounds and comprises a phosphoric acid compound, the content of silica particles is preferably within a range from a lower limit of 9.95% by weight to an upper limit of 49.95%, relative to 100% by weight of the coat. More preferably, the lower limit is 14.95% by weight and the upper limit is 39.95% by weight. The content of the above-mentioned phosphoric acid compound is preferably within the range from the lower limit of 0.05% by weight to the upper limit of 2.5% by weight. More preferably, the lower limit is 0.1% by weight, and the upper limit is 2% by weight. When the contents of silica particles and the phosphoric acid compound are lower than the above respective lower limits, the corrosion resistance may become inferior and, when they exceed the respective upper limits, the adhesion to the substrate and to a top-coating film and the alkali resistance may possibly decrease.

When the inorganic rust preventive (B) comprises silica particles and at least one species selected from the group consisting of phosphoric acid compounds, niobium compounds and zirconium compounds and comprises a niobium compound and/or a zirconium compound, the content of silica particles is preferably within the range from a lower limit of 9% by weight to an upper limit of 49%, relative to 100% by weight of the coat. The lower limit is more preferably 14% by weight, and the upper limit is more preferably 39% by weight. As for the total content of the niobium compound and zirconium compound, it is preferably within the range from a lower limit of 1% by weight to an upper limit of 15% by weight. More preferably, the lower limit is 1.5% by weight, and the upper limit is 10% by weight. When the contents of silica particles and the niobium compound and zirconium compound are lower than the above respective lower limits, the corrosion resistance may become inferior and, when they exceed the respective upper limits, the adhesion to the substrate and to a top-coating film and the alkali resistance may possibly decrease. When the coat comprises both a niobium compound and a zirconium compound, the total content of the niobium compound and zirconium compound, so referred to above, is the total content of the both. When the coat comprises niobium compounds but does not comprise any zirconium compound, it is the total content of the niobium compounds. When the coat comprises zirconium compounds but does not comprise any niobium compound, it is the total content of the zirconium compounds.

In the surface-treated metal sheet, the inorganic rust preventive (B) preferably comprises silica particles, a phosphoric acid compound, and at least one species selected from the group consisting of niobium compounds and zirconium compounds. Better corrosion resistance can be obtained then.

When the inorganic rust preventive (B) comprises silica particles, a phosphoric acid compound, and at least one species from the group consisting of niobium compounds and zirconium compounds, the content of silica particles is preferably within the range from a lower limit of 8.95% by weight to an upper limit of 48.95% by weight, relative to 100% by weight of the coat. The lower limit is more preferably 13.95% by weight, and the upper limit is more preferably 38.95% by weight. As for the content of a phosphoric acid compound, it is preferably within the range from a lower limit of 0.05% by weight to an upper limit of 2.5% by weight. The lower limit is more preferably 0.1% by weight, and the upper limit is more preferably 2% by weight. Further, the total content of the niobium compound and zirconium compound is preferably within the range from a lower limit of 1% by weight to an upper limit of 15% by weight. The lower limit is more preferably 1.5% by weight, and the upper limit is more preferably 10% by weight. When the contents of silica particles, the phosphoric compound, and the niobium compound and zirconium compound are lower than the above respective lower limits, the corrosion resistance may become inferior and, when they exceed the respective upper limits, the adhesion to the substrate and to a top-coating film and the alkali resistance may possibly decrease. When the coat comprises both a niobium compound and a zirconium compound, the total content of the niobium compound and zirconium compound, so referred to above, is the total content of the both. When the coat comprises niobium compounds but does not comprise any zirconium compound, it is the total content of the niobium compounds. When the coat comprises zirconium compounds but does not comprise any niobium compound, it is the total content of the zirconium compounds.

In the surface-treated metal sheet mentioned above, the inorganic rust preventive (B) preferably comprises niobium oxide and/or zirconium oxide. Particularly good corrosion resistance can be obtained then.

In the surface-treated metal sheet mentioned above, the coat formed on the metal sheet surface may comprise one or more other ingredients in addition to the above-mentioned crosslinked resin matrix (A) and the inorganic rust preventive (B) and preferably comprises an organic rust preventive (C). Further improved corrosion resistance can be attained then.

The organic rust preventive (C) is not particularly restricted but any of those organic rust preventives known in the art can be used. Preferably, it includes at least one species selected from the group consisting of guanidino group-containing compounds, biguanidino group-containing compounds and thiocarbonyl group-containing compounds. Like chromium compounds so-far used to provide corrosion resistance, the guanidino group-containing compounds, biguanidino group-containing compounds and thiocarbonyl group-containing compounds are readily adsorbed on the metal surface and, in particular, are effective in preventing white rust on zinc-coated steel sheets, among others.

The guanidino group-containing compounds mentioned above are not particularly restricted but include, among others, guanidine, aminoguanidine, guanylurea, guanylthiourea, 1,3-di-o-tolylguanidine, 1,3-diphenylguanidine, and salts thereof.

The biguanidino group-containing compounds are not particularly restricted but there may be mentioned, for example, 1-o-tolylbiguanide and the like.

The thiocarbonyl group-containing compounds are not particularly restricted but include, among others, thiourea and derivatives thereof, such as methylthiourea, dimethylthiourea, trimethylthiourea, ethylthiourea, diethylthiourea, 1,3-dibutylthiourea, phenylthiourea, diphenylthiourea, 1,3-bis(dimethylaminopropyl)-2-thiourea, ethylenethiourea, propylenethiourea, thiopental, thiocarbazide, thiocarbazones, thiocyanuric acids, thiohydantoin, 2-thiouracil, 3-thiourazole; thioamide compounds and derivatives thereof, such as thioformamide, thioacetamide, thiopropionamide, thiobenzamide, thiocarbostyril and thiosaccharin; thioaldehyde compounds such as thioformaldehyde and thioacetaldehyde; carbothioic acids and salts thereof, such as thioacetic acid, thiobenzoic acid, dithioacetic acid, sodium methyldithiocarbamate, sodium dimethyldithiocarbamate, dimethyldithiocarbamic acid triethylamine salt, sodium diethyldithiocarbamate, pentamethylenedithiocarbamic acid piperidine salt, pipecolyldithiocarbamic acid pipecoline salt and potassium o-ethylxanthate; thiocarbonic acids such as ethylene tridithiocarbonate; other compounds such as thiocoumazone, thiocoumothiazone, thionine blue J, thiopyrone, thiopyrine and thiobenzophenone; and the like. The organic rust preventives (C) mentioned above may be used singly or in the form of a combination of two or more.

As for the content of the organic rust preventive (C) in the coat on the surface-treated metal sheet, it is preferably within the range from a lower limit of 0.1% by weight to an upper limit of 10% by weight, relative to 100% by weight of the coat. When the content is lower than 0.1% by weight, no improvement in corrosion resistance may be achieved. When it exceeds 10% by weight, the adhesion to the substrate or a top-coating film, the alkali resistance and solvent resistance may possibly decrease. The lower limit is more preferably 0.2% by weight, and the upper limit is more preferably 5% by weight.

In the surface-treated metal sheet mentioned above, the coat formed on the metal sheet surface may comprise one or more ingredients in addition to the crosslinked resin matrix (A) and inorganic rust preventive (B), and preferably comprises a lubricant (D). By this, the surface lubricity of the surface-treated metal sheet can be improved and the anti-scratch property can be further improved.

The lubricant (D) is not particularly restricted but use can be made of those lubricants known in the art including fluoride type, hydrocarbon type, fatty acid amide type, ester type, alcohol type, metal soap type and inorganic type ones. Preferably, it comprises at least one species selected from the group consisting of polyolefin waxes and derivatives thereof, and silicones and derivatives thereof.

The polyolefin waxes and derivatives thereof are not particularly restricted but include hydrocarbon-based waxes and derivatives thereof, for example, paraffin, microcrystalline and polyethylene. The derivatives mentioned above are not particularly restricted but include, for example, carboxylated polyolefins and chlorinated polyolefins.

The polyolefin waxes and derivatives thereof more preferably have a softening point of 50 to 160° C. When the softening point is lower than 50° C., they may soften and melt on the occasion of processing, failing to show their excellent characteristics as lubricants. When the softening point is above 160° C., hard particles come to occur on the surface, so that the lubricant characteristics may be deteriorated thereby, leading to failure to obtain a sufficient level of anti-scratch property.

The polyolefin waxes and derivatives thereof are preferably in the form of aqueous dispersions, preferably with a particle diameter of 0.1 to 5 μm. When the diameter is greater than 5 μm, the lubricant distribution may possibly become inhomogeneous and the lubricant may fall off from the coat. When it is smaller than 0.1 μm, the anti-scratch property may become insufficient in certain cases.

The silicones and derivatives thereof are not particularly restricted but include dimethylpolysiloxane, polyether modifications and acrylic modifications thereof, and like polymers.

The silicones and derivatives thereof are preferably soluble or dispersible in water or in the form of aqueous dispersions prepared in advance.

As for the content of the lubricant (D) in the coat on the surface-treated metal sheet mentioned above, it is preferably within the range from a lower limit of 0.1% by weight to an upper limit of 20% by weight, relative to 100% by weight of the coat. When the content is below 0.1% by weight, the effect improving anti-scratch property will be insignificant. When it exceeds 20% by weight, the adhesion to a top-coating film, the alkali resistance and the solvent resistance may possibly decrease. The lower limit is more preferably 0.5% by weight, and the upper limit is more preferably 10% by weight.

The aqueous coating agent to be used for forming the coat comprising the crosslinked resin matrix (A), the inorganic rust preventive (B) and the optional organic rust preventive (C), lubricant (D) and other ingredients employed according to need is only required to contain these components and/or ingredients; hence the order of addition of these is not particularly restricted but that composition may be produced as described below under (1) and (2).

(1) The water-borne resin is heated to an appropriate temperature with stirring and the crosslinking agent is added thereto to effect the reaction. Then, the inorganic rust preventive (B) is incorporated in the resin obtained, if necessary together with the organic rust preventive (C) and/or lubricant (D), to prepare an aqueous composition, if necessary followed by addition of another or other ingredients.

(2) The water-borne resin and the inorganic rust preventive (B) are heated to an appropriate temperature with stirring and the crosslinking agent is added thereto to effect the reaction. Then, after cooling, the organic rust preventive (C), lubricant (D) and other ingredients are incorporated therein according to need.

It is also possible to prepare an aqueous coating agent by compounding the aqueous dispersion of the water-borne resin, the crosslinking agent and the inorganic rust preventive (B), if necessary together with the organic rust preventive (C), lubricant (D) and other ingredients, applying the aqueous coating agent to the metal surface and then allowing the reaction between the water-borne resin and the crosslinking agent to proceed.

The aqueous coating agent to be used for the coat formation preferably has solids concentration of 1 to 50% by weight, more preferably 5 to 30% by weight. When this solids concentration is lower than 1% by weight, the workability in application will be low. When it exceeds 50% by weight, the bath stability or application workability of the aqueous coating agent will decrease.

One or more other additives may further be incorporated in the aqueous coating agent to be used for the coat formation. For example, a pigment and/or a surfactant may be incorporated. Usable as the pigment are, for example, such inorganic pigments as titanium oxide ($TiO_2$), zinc oxide (ZnO), calcium carbonate ($CaCO_3$), barium sulfate ($BaSO_4$), alumina ($Al_2O_3$), kaolin clay, carbon black, iron oxides ($Fe_2O_3$, $Fe_3O_4$), organic pigments and various other colorants. As the surfactant, there may be mentioned, for example, nonionic surfactants and anionic surfactants.

A solvent may be used in the aqueous coating agent to be used for the coat formation so that the coat-forming ability may be improved and the coat may be more uniform and smoother. The solvent is not particularly restricted but may be any of those in general use; for example, there may be mentioned hydrophilic solvents such as alcohols, ketones, esters and ethers from the leveling viewpoint.

The substrate metal sheet applicable in the practice of the invention may be made of iron, an iron-based alloy, aluminum, an aluminum-based alloy, copper or a copper-based alloy, for instance. Any plated metal sheet having an arbitrary plated layer can also be used, and the plated metal sheet includes zinc-coated metal sheets, zinc/nickel-coated metal sheets, zinc/iron-coated metal sheets, zinc/chromium-coated metal sheets, zinc/aluminum-coated metal sheets, zinc/titanium-coated metal sheets, zinc/magnesium-coated metal sheets, zinc/manganese-coated metal sheets, and like zinc-based plated steel sheets plated by electroplating, hot-dipping or vapor deposition, aluminum- or aluminum alloy-coated metal sheets, lead- or lead alloy-coated metal sheets, and tin- or tin alloy-coated metal sheets; the plated layer of these plated metal sheets may further contain small amounts of different types of metal elements or impurities, such as cobalt, molybdenum, tungsten, nickel, titanium, chromium, aluminum, manganese, iron, magnesium, lead, antimony, tin, copper, cadmium and arsenic, and such inorganic substances as silica, alumina and titania dispersed therein. The invention is further applicable to double-coated metal sheets plated by a combination of any of the above-mentioned plating methods and another kind of plating method such as iron plating or iron/phosphorus plating. The method of plating is not particularly restricted but may be any of those techniques known in the art, for example electroplating, hot dipping, vapor deposition, dispersion plating and vacuum plating. These metal sheets may be subjected to such conventional treatment as hot water rinsing and alkali degreasing, for instance, before plating.

The method of applying the aqueous coating agent for the coat formation comprises a step of applying the aqueous coating agent to the metal surface to form a coat. The method of coating is not particularly restricted but those techniques generally used, for example roll coating, air spraying, airless spraying, and dipping, can appropriately be employed. For raising the degree of curing, the substrate is preferably preheated or the substrate after coating is preferably dried with heating. The substrate heating temperature is 50 to 250° C., preferably 70 to 220° C. When the heating temperature is lower than 50° C., the rate of evaporation of water is slow and sufficient coat forming properties cannot be secured, so that the solvent resistance and alkali resistance decrease. On the other hand, at above 250° C., the resin may under go decomposition, leading to decreases insolvent resistance and alkali resistance; the appearance also becomes bad due to yellowing, for instance. The time of heating for drying after coating is preferably 1 second to 5 minutes.

The weight of the coat formed on the metal sheet surface is preferably not lighter than 0.1 g/m$^2$ on the dry weight basis. At levels lower than 0.1 g/m$^2$, the corrosion resistance and alkali resistance may be insufficient. On the other hand, an excessive coverage is uneconomical as an undercoating treatment for coating and also unfavorable for coating and, in addition, reduces the conductivity and thus lowers the weldability; the coverage is more preferably 0.1 to 5 g/m$^2$, still more preferably 0.5 to 2 g/m$^2$.

It is also possible to apply a top-coating composition to the surface of a coat formed by applying the above-mentioned aqueous coating agent to the metal sheet surface, to thereby form a top-coating film rendering the coated metal sheet ready for use. As the top-coating composition, there may be mentioned, for example, coating compositions comprised acrylic resins, acrylic-modified alkyd resins, epoxy resins, urethane resins, melamine resins, phthalic acid resins, amino resins, polyester resins, vinyl chloride resins, etc. These top-coating compositions may comprise a color pigment such as titanium white or carbon black, an extender pigment such as talc, a metal pigment such as an aluminum powder or copper powder, or an antirust pigment such as red lead or lead sulfate, for instance. They may further comprise a dispersant, desiccant, plasticizer, antifoaming agent, thickening agent, stabilizer, anti-skinning agent, antifungal agent, preservative, antifreezing agent, etc.

The thickness of the top-coating film is not particularly restricted but is properly determined according to the intended use of the rustproof metal product, the top-coating composition employed and other factors. It is generally about 5 to 300 μm, more preferably about 10 to 200 μm. The top-coating film can be formed by applying a top-coating composition onto the coat formed by the aqueous coating agent mentioned above, followed by heating for drying and curing. The drying temperature and time are to be properly adjusted according to the top-coating composition species applied, the coating film thickness and other factors. Generally, the drying temperature is preferably 50 to 250° C., and the drying time is preferably 5 minutes to 1 hour. The application of the top-coating composition can be carried out by one of the methods known in the art as selected according to the form of the coating composition.

The surface-treated metal sheet obtained by applying the above-mentioned aqueous coating agent to the metal sheet surface for coat formation is excellent in corrosion resistance, alkali resistance, solvent resistance, adhesion to a coat and anti-scratch property. Further, the product obtained by further application of a top-coating composition for coating film formation shows good adhesion between the coat formed on the steel surface and the top-coating film.

The surface-treated metal sheet of the invention has, on the metal sheet surface, a coat comprising 50 to 90% by weight of a crosslinked resin matrix (A) being formed by the reaction of the water-borne resin with the crosslinking agent and having an acid value of 0 to 30, which is due to carboxylic acid groups not alkali metal-neutralized, and a hydroxyl value of 5 to 50; and 10 to 50% by weight of an inorganic rust preventive (B). As a result, it is excellent in corrosion resistance, alkali resistance, solvent resistance, adhesion to the substrate, and adhesion to a top-coating film.

The surface-treated metal sheet of the present invention, which has the constitution described hereinabove, is excellent in adhesion to the metal sheet, and in coat adhesion to the coating film formed by application of a top-coating composition. It is also excellent in corrosion resistance, alkali resistance, solvent resistance and anti-scratch property.

BEST MODES FOR CARRYING OUT THE INVENTION

The following examples illustrate the present invention in further detail. These examples are, however, by no means limitative of the scope of the present invention. In the examples, "part(s)" and "%" mean "part(s) by weight" and "% by weight" unless otherwise specified.

PRODUCTION EXAMPLE 1

Production of a Water-borne Polyester Resin

Phthalic anhydride, isophthalic acid and adipic acid were reacted with neopentyl glycol, trimethylolpropane and Cardura E10 (produced by Japan Epoxy Resins) under heating, and the obtained polyester resin was neutralized with dimethylethanolamine and dispersed in water.

PRODUCTION EXAMPLE 2

Production of a Water-borne Polyurethane Resin

A water-borne polyurethane resin was prepared by reacting a bisphenol A type diol, a polyester diol derived from neopentyl glycol and isophthalic acid, 2,2-dimethylolpropionic acid and isophoronediisocyanate together, followed by neutralization with triethylamine, and dispersed in water.

PRODUCTION EXAMPLE 3

Production of a Water-borne Epoxy Resin

A water-borne epoxy resin was prepared by modifying a bisphenol A-based epoxy resin with an acrylic resin obtained by radical copolymerization of acrylic acid, 2-ethylhexyl methacrylate and butyl acrylate in the presence of peroxide, followed by neutralization with dimethylethanolamine, and dispersed in water.

PRODUCTION EXAMPLE 4

Production of a Water-borne Polyolefin Resin

A water-borne polyolefin resin was prepared by neutralizing an ethylene-methacrylic acid copolymer resin (Nucrel N2060, produced by Du Pont-Mitsui Polychemicals) with sodium hydroxide (60 equivalent percent relative to all carboxyl groups), and dispersed in water.

PRODUCTION EXAMPLE 5

Preparation of Aqueous Coating Agents

Aqueous coating agents were prepared by compounding the resins obtained in Production Examples 1 to 4 and a crosslinking agent according to the formulations shown in Table 1, followed by further addition of the ingredients specified in Tables 2 to 5.

EXAMPLES 1 TO 18 AND COMPARATIVE EXAMPLES 1 TO 8

Preparation of Surface-treated Metal Sheets

Preparation of Test Plates

A 1-mm-thick electrolytic zinc-coated steel plate (coating weight of zinc: 20 g/m$^2$) and hot-dipped zinc-coated steel plate (coating weight of zinc: 60 g/m$^2$) were degreased by 30 seconds of spray treatment with a 2% aqueous solution of an alkali degreasing agent (Surfcleaner 155, produced by Nippon Paint) at 60° C. Then, each aqueous coating agent obtained was applied to each plate to give a dried coat weight of 1 g/m$^2$ using a bar coater, and the coat was baked in a hot air drying oven at a temperature of 500° C. until arrival of the sheet at a predetermined temperature to give a test plate.

Evaluation Methods

The corrosion resistance, solvent resistance (ethanol, kerosene), alkali resistance, adhesion to a coat, and adhesion to a top-coating film were evaluated. The results are shown in Tables 2 to 5. The evaluation methods used were as follows.

Corrosion Resistance

The edges and reverse side of the test plate were sealed with a tape and subjected to the SST (JIS Z 2371) test. After the lapse of 120 hours, the condition of white rusting was observed and evaluated in terms of white rusted area percentage.

Solvent Resistance

The test plate was set on a rubbing tester and rubbed with ethanol-impregnated absorbent cotton 10 times (reciprocations) under a load of 0.5 kgf/cm$^2$ and then with kerosene-impregnated absorbent cotton 50 times (reciprocations) under a load of 0.5 kgf/cm$^2$, and the condition of the coat was then evaluated according to the following criteria.

4: No trace at all on the rubbed face;
3: Slight traces on the rubbed face;
2: White traces on the rubbed face;
1: Disappearance of the coat from the rubber face.

Alkali Resistance

The test plate was immersed in a 2% aqueous solution (pH 12.5) of an alkali degreasing agent (Surfcleaner 53, produced by Nippon Paint) at 55° C. for 30 minutes and the condition of the coat was then observed and evaluated in terms of residual coat area percentage.

Adhesion to a Coat

The test plate was subjected to 8-mm extrusion processing using an Erichsen tester, a pressure-sensitive adhesive cellophane tape (produced by Nichiban) was then applied to the extruded portion and the coat was subjected to forced peeling. The test plate was immersed in a methyl violet staining solution, and the condition of the coat was evaluated and given a score of 10 (no peeling) to 1 (complete peeling off) according to the residual coat area percentage.

Adhesion to a Top-coating Film

A melamine alkyd coating composition (Superlac 100, produced by Nippon Paint) was applied to the test plate surface to give a dry mass thickness of 20 µm using a bar coater, and the coat was baked at 120° C. for 25 minutes. After overnight standing, the test panel was immersed in boiling water for 30 minutes and, after taking out and 1 day of standing, the coat was given square cuts at 1-mm intervals and further subjected to 7-mm extrusion on an Erichsen tester. A cellophane tape (produced by Nichiban) was applied to the extruded portion, followed by forced peeling. The condition of the coat after forced peeling operation was evaluated and given a score of 10 (no peeling) to 1 (complete peeling off) according to the residual coat area percentage.

TABLE 1

|  |  | Crosslinked resin matrix | | | | | | | | |
|---|---|---|---|---|---|---|---|---|---|---|
|  |  | A | B | C | D | E | F | G | H | I |
| Resin | Water-borne polyester resin | 65 | — | — | — | — | — | — | 100 | — |
|  | Water-borne polyurethane resin | — | 77 | 93 | 87 | — | — | 44 | — | — |
|  | Water-borne epoxy resin | — | — | — | — | 72 | — | — | — | — |
|  | Water-borne polyolefin resin | — | — | — | — | — | 80 | 44 | — | 100 |
| Crosslinking agent | Melamine resin*[1] | 30 | 20 | — | — | 25 | — | — | — | — |
|  | Glycerol polyglycidyl ether | — | — | — | — | — | 5 | 2 | — | — |
|  | Carbodiimide compound*[2] | — | — | — | 10 | — | — | 5 | — | — |
|  | γ-Glycidoxypropyltrimethoxysilane | — | 3 | 3 | 3 | 3 | 5 | 5 | — | — |
|  | Ammonium zirconyl carbonate | — | — | 4 | — | — | — | — | — | — |

TABLE 1-continued

|  | Crosslinked resin matrix | | | | | | | | |
|---|---|---|---|---|---|---|---|---|---|
|  | A | B | C | D | E | F | G | H | I |
| Dibutoxybis(triethanolaminato) titanium | 5 | — | — | — | — | 10 | — | — | — |
| Baking conditions (PMT ° C.) | 200 | 200 | 180 | 180 | 200 | 180 | 180 | 180 | 180 |
| Acid value | 16 | 20 | 17 | 19 | 11 | 10 | 12 | 25 | 52 |
| Hydroxyl value | 34 | 9 | 8 | 8 | 43 | 20 | 20 | 200 | 0 |

*[1]Cymel 385, produced by Cytec
*[2]Carbodilite E-02, produced by Nisshinbo

TABLE 2

Metal plates used: electrolytic zinc-coated steel plates

|  |  | Example | | | | | | | | |
|---|---|---|---|---|---|---|---|---|---|---|
|  |  | 1 | 2 | 3 | 4 | 5 | 6 | 7 | 8 | 9 |
| Crosslinked resin matrix | A | 73.5 | — | — | — | — | — | — | — | — |
|  | B | — | 72.7 | 70.7 | — | — | — | — | — | — |
|  | C | — | — | — | 68.2 | — | — | — | — | — |
|  | D | — | — | — | — | 74 | — | — | — | — |
|  | E | — | — | — | — | — | 75.5 | — | — | — |
|  | F | — | — | — | — | — | — | 68.5 | 76.2 | — |
|  | G | — | — | — | — | — | — | — | — | 73.7 |
| Inorganic rust preventive | Colloidal silica | 22 | 22 | 28 | 28 | 22 | 22 | 28 | 22 | 18 |
|  | Phosphoric acid | — | 0.3 | 0.3 | 0.3 | 0.5 | — | — | 0.3 | 0.3 |
|  | Niobium oxide sol | 2.5 | 5 | — | 2.5 | 2.5 | 2.5 | 2.5 | — | 7.5 |
| Organic rust preventive | Diethylthiourea | 2 | — | — | — | — | — | — | — | — |
|  | Guanylthiourea | — | — | — | 1 | — | — | — | — | — |
|  | Sodium dimethyldithiocarbamate | — | — | 1 | — | 1 | — | — | — | — |
|  | 1-o-Tolylbiguanide | — | — | — | — | — | — | 1 | 1.5 | — |
|  | Guanidine | — | — | — | — | — | — | — | — | 0.5 |
| Coat performance characteristics | Corrosion resistance | 0 | 0 | 10 | 5 | 0 | 0 | 0 | 5 | 0 |
|  | Solvent resistance  Ethanol | 4 | 4 | 4 | 3 | 3 | 4 | 4 | 4 | 3 |
|  | Solvent resistance  Kerosene | 4 | 4 | 4 | 4 | 4 | 4 | 3 | 3 | 4 |
|  | Alkali resistance | 100 | 100 | 100 | 90 | 95 | 100 | 100 | 100 | 100 |
|  | Adhesion  Adhesion to a coat | 8 | 9 | 9 | 10 | 10 | 9 | 10 | 10 | 10 |
|  | Adhesion to a top-coating film | 10 | 10 | 10 | 10 | 10 | 10 | 10 | 10 | 10 |

TABLE 3

Metal plates used: electrolytic zinc-coated steel plates

|  |  | Comparative Example | | | |
|---|---|---|---|---|---|
|  |  | 1 | 2 | 3 | 4 |
| Crosslinked resin matrix | B | 91.7 | — | — | — |
|  | F | — | 29 | — | — |
|  | H | — | — | 74 | — |
|  | I | — | — | — | 68.5 |
| Inorganic rust preventive | Colloidal silica | 3 | 67.5 | 22 | 28 |
|  | Phosphoric acid | 0.3 | — | 0.5 | — |
|  | Niobium oxide sol | 5 | 2.5 | 2.5 | 2.5 |
| Organic rust preventive | Sodium dimethyldithiocarbamate | — | — | 1 | — |
|  | 1-o-Tolylbiguanide | — | 1 | — | 1 |
| Coat performance | Corrosion resistance | 90 | 90 | 100 | 10 |
|  | Solvent   Ethanol | 3 | 2 | 1 | 3 |
| characteristics | resistance  Kerosene | 3 | 3 | 2 | 2 |
|  | Alkali resistance | 90 | 20 | 0 | 0 |
|  | Adhesion  Adhesion to a coat | 8 | 5 | 8 | 3 |
|  | Adhesion to a top-coating film | 8 | 5 | 3 | 3 |

TABLE 4

Metal plates used: hot-dipped zinc-coated steel plates

| | | Example | | | | | | | | |
|---|---|---|---|---|---|---|---|---|---|---|
| | | 10 | 11 | 12 | 13 | 14 | 15 | 16 | 17 | 18 |
| Crosslinked resin matrix | A | 73.5 | — | — | — | — | — | — | — | — |
| | B | — | 72.7 | 70.7 | — | — | — | — | — | — |
| | C | — | — | — | 68.2 | — | — | — | — | — |
| | D | — | — | — | — | 74 | — | — | — | — |
| | E | — | — | — | — | — | 75.5 | — | — | — |
| | F | — | — | — | — | — | — | 68.5 | 76.2 | — |
| | G | — | — | — | — | — | — | — | — | 73.7 |
| Inorganic rust preventive | Colloidal silica | 22 | 22 | 28 | 28 | 22 | 22 | 28 | 22 | 18 |
| | Phosphoric acid | — | 0.3 | 0.3 | 0.3 | 0.5 | — | — | 0.3 | 0.3 |
| | Niobium oxide sol | 2.5 | 5 | — | 2.5 | 2.5 | 2.5 | 2.5 | — | 7.5 |
| Organic rust preventive | Diethylthiourea | 2 | — | — | — | — | — | — | — | — |
| | Guanylthiourea | — | — | — | 1 | — | — | — | — | — |
| | Sodium dimethyldithiocarbamate | — | — | 1 | — | 1 | — | — | — | — |
| | 1-o-Tolylbiguanide | — | — | — | — | — | — | 1 | 1.5 | — |
| | Guanidine | — | — | — | — | — | — | — | — | 0.5 |
| Coat performance characteristics | Corrosion resistance | 0 | 0 | 10 | 5 | 0 | 0 | 0 | 5 | 0 |
| | Solvent resistance Ethanol | 4 | 4 | 4 | 3 | 3 | 4 | 4 | 4 | 3 |
| | Solvent resistance Kerosene | 4 | 4 | 4 | 4 | 4 | 4 | 3 | 3 | 4 |
| | Alkali resistance | 100 | 100 | 100 | 90 | 95 | 100 | 100 | 100 | 100 |
| | Adhesion Adhesion to a coat | 8 | 9 | 9 | 10 | 10 | 9 | 10 | 10 | 10 |
| | Adhesion to a top-coating film | 10 | 10 | 10 | 10 | 10 | 10 | 10 | 10 | 10 |

TABLE 5

Metal plates used: hot-dipped zinc-coated steel plates

| | | Comparative Example | | | |
|---|---|---|---|---|---|
| | | 5 | 6 | 7 | 8 |
| Crosslinked resin matrix | B | 91.7 | — | — | — |
| | F | — | 29 | — | — |
| | H | — | — | 74 | — |
| | I | — | — | — | 68.5 |
| Inorganic rust preventive | Colloidal silica | 3 | 67.5 | 22 | 28 |
| | Phosphoric acid | 0.3 | — | 0.5 | — |
| | Niobium oxide sol | 5 | 2.5 | 2.5 | 2.5 |
| Organic rust preventive | Sodium dimethyldithiocarbamate | — | — | 1 | — |
| | 1-o-Tolylbiguanide | — | 1 | — | 1 |
| Coat performance characteristics | Corrosion resistance | 90 | 90 | 100 | 10 |
| | Solvent resistance Ethanol | 3 | 2 | 1 | 3 |
| | Solvent resistance Kerosene | 3 | 3 | 2 | 2 |
| | Alkali resistance | 90 | 20 | 0 | 0 |
| | Adhesion Adhesion to a coat | 8 | 5 | 8 | 3 |
| | Adhesion to a top-coating film | 8 | 5 | 3 | 3 |

EXAMPLES 19 TO 36

Preparation of Surface-treated Metal Sheets

Preparation of Test Plates

Test plates were prepared in the same manner as in Example 1 except that the aqueous coating agents prepared by further adding the ingredients specified in Tables 6 to 9 utilizing a lubricant.

The test plates were evaluated for the above-mentioned corrosion resistance, solvent resistance (ethanol, kerosene), alkali resistance, adhesion to a coat and adhesion to a top-coating film and, in addition, for anti-scratch property by the method given below. The results are shown in Tables 6 to 9. The test plates of Comparative Examples 3, 4, 7 and 8 were also evaluated for anti-scratch property.

Anti-scratch Property

The test plate was set on a rubbing tester and rubbed with a stainless steel ball with a diameter of 10 mm under the conditions of a load of 0.5 kgf and a speed of once (reciprocation)/second five times (reciprocations) and then the test plate surface was evaluated for the extent of damage according to the following criteria.

4: No scratch at all on the test sheet surface;
3: Slight scratch on the test sheet surface;
2: Distinct scratch on the test sheet surface;
1: scratch with a metallic luster on the test sheet surface.

TABLE 6

Metal plates used: electrolytic zinc-coated steel plates

|  |  | Example | | | | | | | | |
|---|---|---|---|---|---|---|---|---|---|---|
|  |  | 19 | 20 | 21 | 22 | 23 | 24 | 25 | 26 | 27 |
| Crosslinked resin matrix | A | 68.5 | — | — | — | — | — | — | — | — |
|  | B | — | 67.7 | 65.7 | — | — | — | — | — | — |
|  | C | — | — | — | 63.2 | — | — | — | — | — |
|  | D | — | — | — | — | 64 | — | — | — | — |
|  | E | — | — | — | — | — | 73.5 | — | — | — |
|  | F | — | — | — | — | — | — | 66.5 | 72.2 | — |
|  | G | — | — | — | — | — | — | — | — | 71.7 |
| Inorganic rust preventive | Colloidal silica | 22 | 22 | 28 | 28 | 22 | 22 | 28 | 22 | 18 |
|  | Phosphoric acid | — | 0.3 | 0.3 | 0.3 | 0.5 | — | — | 0.3 | 0.3 |
|  | Niobium oxide sol | 2.5 | 5 | — | 2.5 | 2.5 | 2.5 | 2.5 | — | 7.5 |
| Organic rust preventive | Diethylthiourea | 2 | — | — | — | — | — | — | — | — |
|  | Guanylthiourea | — | — | — | 1 | — | — | — | — | — |
|  | Sodium dimethyldithiocarbamate | — | — | 1 | — | 1 | — | — | — | — |
|  | 1-o-Tolylbiguanide | — | — | — | — | — | — | 1 | 1.5 | — |
|  | Guanidine | — | — | — | — | — | — | — | — | 0.5 |
| Lubricant | Polyethylene wax (particle diameter 2.5 μm, softening point 110° C.) | 5 | — | — | — | 10 | — | — | — | — |
|  | Polyethylene wax (particle diameter 1.0 μm, softening point 130° C.) | — | 5 | — | — | — | 2 | — | — | — |
|  | Polyethylene wax (particle diameter 1.0 μm, softening point 110° C.) | — | — | 5 | — | — | — | 2 | 2 | 2 |
|  | Silicone-acrylic (30:70) copolymer emulsion | — | — | — | 5 | — | — | — | 2 | — |
| Coat performance characteristics | Corrosion resistance | 0 | 0 | 10 | 5 | 0 | 0 | 0 | 5 | 0 |
|  | Solvent resistance — Ethanol | 4 | 4 | 4 | 3 | 3 | 4 | 4 | 4 | 3 |
|  | Solvent resistance — Kerosene | 4 | 4 | 4 | 4 | 4 | 4 | 3 | 3 | 4 |
|  | Alkali resistance | 100 | 100 | 100 | 90 | 95 | 100 | 100 | 100 | 100 |
|  | Adhesion — Adhesion to a coat | 8 | 9 | 9 | 10 | 10 | 9 | 10 | 10 | 10 |
|  | Adhesion — Adhesion to a top-coating film | 10 | 10 | 10 | 10 | 10 | 10 | 10 | 10 | 10 |
|  | Anti-scratch property | 4 | 4 | 4 | 4 | 4 | 3 | 3 | 4 | 3 |

TABLE 7

Metal plates used: electrolytic zinc-coated steel plates

|  |  | Comparative Example | |
|---|---|---|---|
|  |  | 3 | 4 |
| Crosslinked resin matrix | B | — | — |
|  | F | — | — |
|  | H | 74 | — |
|  | I | — | 68.5 |
| Inorganic rust preventive | Colloidal silica | 22 | 28 |
|  | Phosphoric acid | 0.5 | — |
|  | Niobium oxide sol | 2.5 | 2.5 |
| Organic rust preventive | Sodium dimethyldithiocarbamate | 1 | — |
|  | 1-o-Tolylbiguanide | — | 1 |
| Coat performance characteristics | Corrosion resistance | 100 | 10 |
|  | Solvent resistance — Ethanol | 1 | 3 |
|  | Solvent resistance — Kerosene | 2 | 2 |
|  | Alkali resistance | 0 | 0 |
|  | Adhesion — Adhesion to a coat | 8 | 3 |
|  | Adhesion — Adhesion to a top-coating film | 3 | 3 |
|  | Anti-scratch property | 1 | 1 |

TABLE 8

Metal plates used: hot-dipped zinc-coated steel plates

|  |  | Example | | | | | | | | |
|---|---|---|---|---|---|---|---|---|---|---|
|  |  | 28 | 29 | 30 | 31 | 32 | 33 | 34 | 35 | 36 |
| Crosslinked resin matrix | A | 68.5 | — | — | — | — | — | — | — | — |
|  | B | — | 67.7 | 65.7 | — | — | — | — | — | — |
|  | C | — | — | — | 63.2 | — | — | — | — | — |
|  | D | — | — | — | — | 64 | — | — | — | — |
|  | E | — | — | — | — | — | 73.5 | — | — | — |

TABLE 8-continued

Metal plates used: hot-dipped zinc-coated steel plates

| | | Example | | | | | | | | |
|---|---|---|---|---|---|---|---|---|---|---|
| | | 28 | 29 | 30 | 31 | 32 | 33 | 34 | 35 | 36 |
| | F | — | — | — | — | — | — | 66.5 | 72.2 | — |
| | G | — | — | — | — | — | — | — | — | 71.7 |
| Inorganic rust preventive | Colloidal silica | 22 | 22 | 28 | 28 | 22 | 22 | 28 | 22 | 18 |
| | Phosphoric acid | — | 0.3 | 0.3 | 0.3 | 0.5 | — | — | 0.3 | 0.3 |
| | Niobium oxide sol | 2.5 | 5 | — | 2.5 | 2.5 | 2.5 | 2.5 | — | 7.5 |
| Organic rust preventive | Diethylthiourea | 2 | — | — | — | — | — | — | — | — |
| | Guanylthiourea | — | — | — | 1 | — | — | — | — | — |
| | Sodium dimethyldithiocarbamate | — | — | 1 | — | 1 | — | — | — | — |
| | 1-o-Tolylbiguanide | — | — | — | — | — | — | 1 | 1.5 | — |
| | Guanidine | — | — | — | — | — | — | — | — | 0.5 |
| Lubricant | Polyethylene wax (particle diameter 2.5 μm, softening point 110° C.) | 5 | — | — | — | 10 | — | — | — | — |
| | Polyethylene wax (particle diameter 1.0 μm, softening point 130° C.) | — | 5 | — | — | — | 2 | — | — | — |
| | Polyethylene wax (particle diameter 1.0 μm, softening point 110° C.) | — | — | 5 | — | — | — | 2 | 2 | 2 |
| | Silicone-acrylic (30:70) copolymer emulsion | — | — | — | 5 | — | — | — | 2 | — |
| Coat performance characteristics | Corrosion resistance | 0 | 0 | 10 | 5 | 0 | 0 | 0 | 5 | 0 |
| | Solvent resistance  Ethanol | 4 | 4 | 4 | 3 | 3 | 4 | 4 | 4 | 3 |
| | Kerosene | 4 | 4 | 4 | 4 | 4 | 4 | 3 | 3 | 4 |
| | Alkali resistance | 100 | 100 | 100 | 90 | 95 | 100 | 100 | 100 | 100 |
| | Adhesion  Adhesion to a coat | 8 | 9 | 9 | 10 | 10 | 9 | 10 | 10 | 10 |
| | Adhesion to a top-coating film | 10 | 10 | 10 | 10 | 10 | 10 | 10 | 10 | 10 |
| | Anti-scratch property | 4 | 4 | 4 | 4 | 4 | 3 | 3 | 4 | 3 |

TABLE 9

Metal plates used: hot-dipped zinc-coated steel plates

| | | Comparative Example | |
|---|---|---|---|
| | | 7 | 8 |
| Crosslinked resin matrix | B | — | — |
| | F | — | — |
| | H | 74 | — |
| | I | — | 68.5 |
| Inorganic rust preventive | Colloidal silica | 22 | 28 |
| | Phosphoric acid | 0.5 | — |
| | Niobium oxide sol | 2.5 | 2.5 |
| Organic rust preventive | Sodium dimethyldithiocarbamate | 1 | — |
| | 1-o-Tolylbiguanide | — | 1 |
| Coat performance characteristics | Corrosion resistance | 100 | 10 |
| | Solvent resistance  Ethanol | 1 | 3 |
| | Kerosene | 2 | 2 |
| | Alkali resistance | 0 | 0 |
| | Adhesion  Adhesion to a coat | 8 | 3 |
| | Adhesion to a top-coating film | 3 | 3 |
| | Anti-scratch property | 1 | 1 |

The surface-treated metal sheets of the Examples were excellent in all the performance characteristics: corrosion resistance, alkali resistance, solvent resistance, and adhesion. On the other hand, when the amount of the crosslinked resin matrix (A) was excessive (Comparative Examples 1 and 5), when the amount of the crosslinked resin matrix (A) was too small (Comparative Examples 2 and 6), when the hydroxyl value was excessive (Comparative Examples 3 and 7) or when the acid value was excessive (Comparative Examples 4 and 8), the test plates were not excellent in all of these performance characteristics. Further, the lubricant addition could provide a good anti-scratch property.

INDUSTRIAL APPLICABILITY

The surface-treated metal sheets of the invention can be suitably used in the fields of household electric appliances, business machines, building materials, automobiles, and so on.

The invention claimed is:

1. A surface-treated metal sheet with a coat comprising 50 to 90% by weight of a crosslinked resin matrix (A) and 10 to 50% by weight of an inorganic rust preventive (B) as formed directly on the metal sheet surface,
   wherein the crosslinked resin matrix (A) is formed by the reaction between a water-borne resin and a crosslinking agent and has an acid value of 0 to 30 due to carboxylic acid groups not neutralized by an alkali metal and a hydroxyl value of 5 to 50, and wherein the water-borne resin is at least one member selected from the group consisting of water-borne polyurethane resins, water-borne epoxy resins and water-borne polyolefin resins.

2. The surface-treated metal sheet according to claim 1, wherein the coat formed on the metal sheet surface further comprises 0.1 to 10% by weight of an organic rust preventive (C).

3. The surface-treated metal sheet according to claim 2, wherein the organic rust preventive (C) comprises at least one species selected from the group consisting of guanidino group-containing compounds, biguanidino group-containing compounds and thiocarbonyl group-containing compounds.

4. The surface-treated metal sheet according to claim 2 wherein the coat formed on the metal sheet surface further comprises 0.1 to 20% by weight of a lubricant (D).

5. The surface-treated metal sheet according to claim 2, wherein the crosslinking agent is at least one species selected from the group consisting of amino resins, polyisocyanate compounds, blocked polyisocyanate compounds, epoxy compounds, carbodiimide compounds, silane compounds, crosslinking zirconium compounds and titanium compounds.

6. The surface-treated metal sheet according to claim 2, wherein the water-borne resin is an alkali metal-neutralized ethylene-unsaturated carboxylic acid copolymer with a neutralization degree of 30 to 90%.

7. The surface-treated metal sheet according to claim 2, wherein the inorganic rust preventive (B) comprises silica particles and at least one species selected from the group consisting of phosphoric acid compounds, niobium compounds and zirconium compounds.

8. The surface-treated metal sheet according to claim 1 wherein the coat formed on the metal sheet surface further comprises 0.1 to 20% by weight of a lubricant (D).

9. The surface-treated metal sheet according to claim 8, wherein the lubricant (D) comprises at least one species selected from the group consisting of polyolefin waxes, derivatives of the wax, silicones and derivatives of the silicone.

10. The surface-treated metal sheet according to claim 8, wherein the crosslinking agent is at least one species selected from the group consisting of amino resins, polyisocyanate compounds, blocked polyisocyanate compounds, epoxy compounds, carbodiimide compounds, silane compounds, crosslinking zirconium compounds and titanium compounds.

11. The surface-treated metal sheet according to claim 8, wherein the water-borne resin is an alkali metal-neutralized ethylene-unsaturated carboxylic acid copolymer with a neutralization degree of 30 to 90%.

12. The surface-treated metal sheet according to claim 1, wherein the crosslinking agent is at least one species selected from the group consisting of amino resins, polyisocyanate compounds, blocked polyisocyanate compounds, epoxy compounds, carbodiimide compounds, silane compounds, crosslinking zirconium compounds and titanium compounds.

13. The surface-treated metal sheet according to claim 12, wherein the water-borne resin is an alkali metal-neutralized ethylene-unsaturated carboxylic acid copolymer with a neutralization degree of 30 to 90%.

14. The surface-treated metal sheet according to claim 1, wherein the water-borne resin is an alkali metal-neutralized ethylene-unsaturated carboxylic acid copolymer with a neutralization degree of 30 to 90%.

15. The surface-treated metal sheet according to claim 1, wherein the inorganic rust preventive (B) comprises silica particles and at least one species selected from the group consisting of phosphoric acid compounds, niobium compounds and zirconium compounds.

16. The surface-treated metal sheet according to claim 15, wherein the content of silica particles in the coat is 9.95 to 49.95% by weight and the content of the phosphoric acid compound in the coat is 0.05 to 2.5% by weight.

17. The surface-treated metal sheet according to claim 15, wherein the content of silica particles in the coat is 9 to 49% by weight and the total content of the niobium compound and zirconium compound in the coat is 1 to 15% by weight.

18. The surface-treated metal sheet according to claim 1, wherein the inorganic rust preventive (B) comprises silica particles, a phosphoric acid compound, and at least one species selected from the group consisting of niobium compounds and zirconium compounds.

19. The surface-treated metal sheet according to claim 18, wherein, in the coat, the content of silica particles is 8.95 to 48.95% by weight, the content of the phosphoric acid compound is 0.05 to 2.5% by weight, and the total content of the niobium compound and zirconium compound is 1 to 15% by weight.

20. The surface-treated metal sheet according to claim 1, wherein the inorganic rust preventive (B) comprises niobium oxide and/or zirconium oxide.

* * * * *